(12) United States Patent
Moechnig

(10) Patent No.: US 8,833,784 B2
(45) Date of Patent: Sep. 16, 2014

(54) BICYCLE FORK ASSEMBLY

(75) Inventor: Steven Moechnig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 13/353,712

(22) Filed: Jan. 19, 2012

(65) Prior Publication Data

US 2013/0187357 A1    Jul. 25, 2013

(51) Int. Cl.
    B62K 21/02    (2006.01)
(52) U.S. Cl.
    USPC ............ 280/276; 280/275; 280/279; 280/283
(58) Field of Classification Search
    USPC ......... 280/275, 276, 277, 283, 284, 285, 274, 280/278, 279, 280, 281.1
    See application file for complete search history.

(56) References Cited

U.S. PATENT DOCUMENTS

| | | | | |
|---|---|---|---|---|
| 628,723 | A * | 7/1899 | McKee | 280/285 |
| 937,614 | A * | 10/1909 | Lampel | 280/276 |
| 1,056,492 | A * | 3/1913 | Bilsten | 280/284 |
| 5,183,281 | A | 2/1993 | Stephens | |
| 5,319,995 | A | 6/1994 | Huang | |
| 5,427,208 | A | 6/1995 | Motobu et al. | |
| 5,704,626 | A | 1/1998 | Kesinger | |
| 5,857,694 | A | 1/1999 | Lazarus et al. | |
| 6,092,823 | A * | 7/2000 | Busby | 280/284 |
| 6,109,637 | A | 8/2000 | Kirk | |
| 6,382,201 | B1 | 5/2002 | McPherson et al. | |
| 6,669,218 | B1 | 12/2003 | Sinyard et al. | |
| 6,709,352 | B1 | 3/2004 | Albin | |
| 6,916,035 | B2 | 7/2005 | Houser et al. | |
| 7,017,930 | B2 | 3/2006 | Callahan et al. | |
| 7,125,030 | B2 | 10/2006 | D'Aluisio et al. | |
| 7,144,028 | B2 | 12/2006 | Sinyard et al. | |
| 7,175,191 | B2 | 2/2007 | Sinyard et al. | |
| 7,380,808 | B2 | 6/2008 | D'Aluisio et al. | |
| 7,398,986 | B2 | 7/2008 | Sinyard et al. | |
| 7,540,570 | B2 | 6/2009 | Lund | |
| 8,454,044 | B2 * | 6/2013 | Chubbuck et al. | 280/276 |
| 2005/0279598 | A1 | 12/2005 | McPherson | |
| 2006/0163831 | A1 | 7/2006 | Henrickson | |
| 2009/0072455 | A1 | 3/2009 | McPherson | |
| 2011/0018223 | A1 | 1/2011 | McPherson | |

FOREIGN PATENT DOCUMENTS

| | | |
|---|---|---|
| EP | 1 840 021 A2 | 3/2007 |
| JP | 2003081168 A | 3/2003 |
| KR | 1020020069477 | 5/2004 |

* cited by examiner

*Primary Examiner* — Joseph M Rocca
*Assistant Examiner* — Marc A Scharich

(57) ABSTRACT

A vibration dampening bicycle fork assembly includes a pair of fork legs that sweep in a forward direction relative to a longitudinal axis of a steerer tube that extends in an opposite direction from a fork crown. A dropout is secured to a distal end of each fork leg and a dampener formed of an elastomeric material wraps about at least a portion of an exterior surface of each dropout. A passage extends through the dropout, is offset from the respective fork leg and is aligned with a pair of openings formed in opposite lateral sides of the dampener. An optional fastener cooperates with the passage and the openings and has a mass that is selected to further counteract vibration of the respective fork leg.

22 Claims, 6 Drawing Sheets

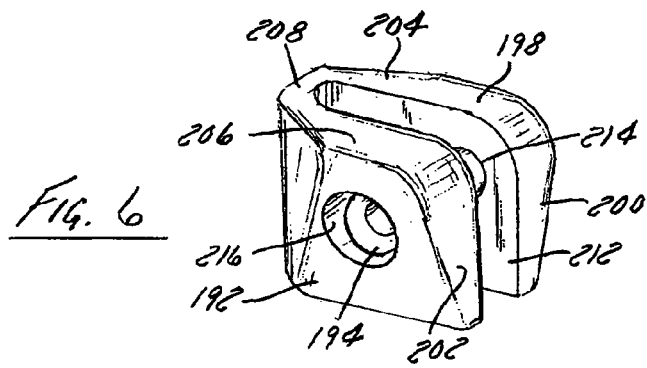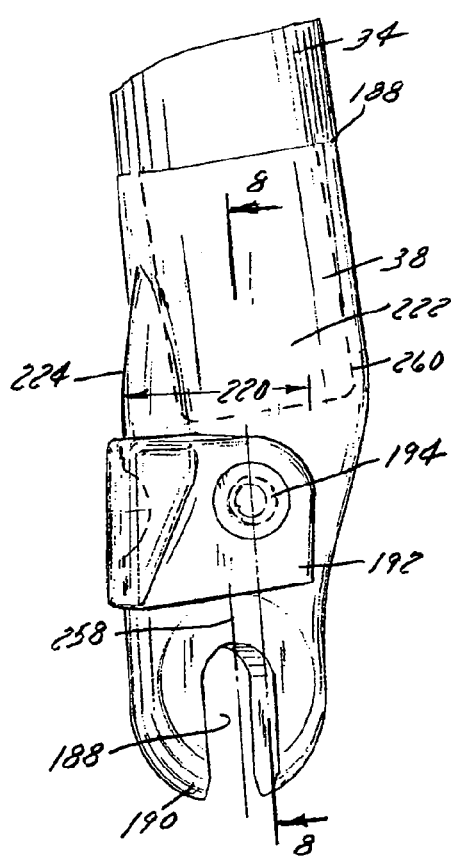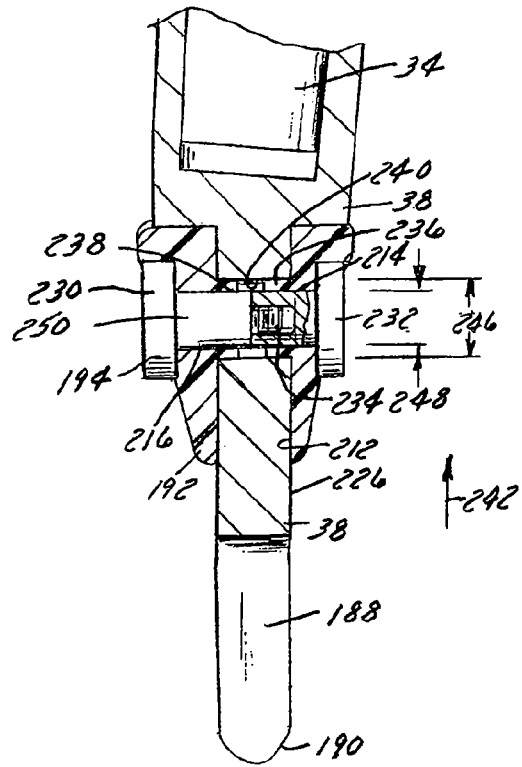

BICYCLE FORK ASSEMBLY

BACKGROUND OF THE INVENTION

The present invention relates generally to bicycles and, more particularly, to a bicycle fork and steerer assemblies that dampen fork leg vibration to mitigate the transmission of road vibration to the handlebars and to the rider therefrom.

Bicycle fork leg and steerer assemblies commonly include a pair of forks that extend from a fork crown in a downward direction and flank a front wheel. An axle or skewer passes through the wheel and cooperates with a fork tip formed at a distal end of each fork leg so as to secure the wheel to the fork legs. A steerer tube extends from the fork crown in an opposite direction relative to the fork legs and rotatable cooperates with a head tube of a bicycle frame. A handlebar is secured to the steerer tube such that rotation of the handlebar about the axis of rotation of the steerer tube effectuates steering of the front wheel assembly.

Many bicycles have fork legs and fork tips that are formed as substantially rigid, generally linear, one-piece assemblies. The steerer tube is commonly aligned with a longitudinal axis of the fork legs and/or the fork legs extend in a substantially linear and slightly forward manner relative to their interaction with the fork crown. During operation of the underlying bicycle, vibrations associated with interaction of the wheel with the road and rotational operation of the wheel generates vibrations that are communicated through the steerer and fork leg assembly to the fork crown, the head tube of the bicycle frame, and to the handlebars attached thereto.

To mitigate the vibrations subjected to the rider, many riders of off-road or mountain bicycles equip their bicycles with vibration dampening handlebar grips. Such grips commonly include a robust connection modality for securing the grips to the handlebar and a flexible or compressible media selected to allow secure interaction of the rider's hands with the handlebar to maintain controlled operation of the bicycle and which absorb at least some of the vibrations attributable to the fork leg assembly and ultimately communicated to the handlebar. Unfortunately, such vibration isolating grip assemblies do not resolve or otherwise mitigate vibration of the steerer assembly. Accordingly, many steerer and fork leg assemblies must be provided with a robust construction which is capable of withstanding the vibrations associated with extended operation the bicycles so equipped.

Bicycles intended to be ridden upon paved surfaces, commonly referred to as road bikes, are provided with a generally curvilinear handlebar assembly. Such handlebars provide various grip positions so that a rider can periodically adjust the position of their torso to reduce fatigue and improve aerodynamic function. Commonly, such handlebars allow the rider to maintain a "tuck" position and a slightly more upright, but still forward inclined portion. Unfortunately, such handlebar assemblies commonly have distal ends that are ill-positioned for use with many of the known padded grip assemblies. In an effort to reduce agitation of the rider's hands caused by interaction with such handlebars, many riders/manufacturers commonly wrap such handlebars with grip tape and/or padded, leather, or foam type tapes to improve the ability of the rider to grip such bars. Even with such wraps, there is still a desire to mitigate the transmission of vibrations to the rider and to the bicycle frame due to the vibrational oscillation of the steerer and fork assembly.

Others mitigate vibration of the fork leg and steerer assembly via manipulation of the construction of the fork leg. Commonly, such configurations require the formation of a passage through the structure of the fork leg for accommodating a vibration dampening member. Unfortunately, the formation of the passage through the respective fork legs alters the cross-sectional shape of the fork leg and commonly increases the amount of material required to form the respective fork legs, increases post fork leg formation manufacturing processes, and increases the aerodynamic profile of the respective fork legs. Use of such leg assemblies without the respective vibration dampener creates fork legs with substantial cavities or passages that detract from the esthetic appearance of the respective fork leg and even further detrimentally affect the aerodynamic performance of the fork leg assembly.

Therefore, there is a need to provide a bicycle steerer and fork leg assembly that is constructed to absorb and/or dissipate a portion of the vibration of the steerer assembly associated with bicycle operation. There is a need for a bicycle steerer and fork leg assembly that better isolates the rider from the vibrations associated with operation of the bicycle by mitigating vibration of the steerer assembly before such vibrations are communicated to the handlebars and/or the frame of the bicycle. It would also be desirable to provide a steerer and fork leg assembly that is both robust and lightweight and which tolerates increased vertical compliance of the fork leg assembly so as to further improve the vibration limiting construction of the fork leg and steerer tube assembly.

BRIEF DESCRIPTION OF THE INVENTION

The present invention provides a bicycle fork leg and steerer assembly that overcomes one or more of the aforementioned drawbacks. One aspect of the invention discloses a vibration dampening bicycle fork assembly includes a pair of fork legs that sweep in a forward direction relative to a longitudinal axis of a steerer tube that extends in an opposite direction from a fork crown. A dropout is secured to a distal end of each fork leg and a dampener formed of an elastomeric material wraps about a portion of each dropout and is offset from the respective fork leg. A passage extends through the dropout and is aligned with a pair of openings formed in opposite lateral sides of the dampener. An optional fastener cooperates with the passage and the openings and biases the dampener into engagement with the respective dropout. Preferably, each fastener has a mass that is selected to counteract vibration of the respective fork leg.

A bicycle fork leg assembly according to another aspect of the invention useable with one or more of the above aspects includes a fork crown, a steerer tube, and a first fork leg and a second fork leg. The steerer tube extends along a longitudinal axis such that the steerer tube extends from a first side of the fork crown in a first direction and each fork leg has a respective longitudinal axis and extends from opposite lateral ends of the fork crown in a second direction that is generally opposite the first direction and such that the longitudinal axis of each fork leg extends in a more forward direction than the longitudinal axis of the steerer tube when secured to a bicycle. A dropout is secured to a distal end of each of the first fork leg and the second fork leg that is opposite the fork crown. Each dropout has an axle opening that cooperates with an axle associated with a wheel. A dampener that is formed of a resilient material is engaged with each dropout. Each dampener is defined by a single elongate body having a length and/or a diameter that is sufficient to allow the dampener to wrap about an exterior surface of the respective dropout so that the dampener is in contact with the dropout and offset from the respective fork leg. In a preferred embodiment, no more than three sides of the corresponding dropout are in contact with the dropout.

Another aspect of the invention that is useable or combinable with one or more of the aspects discloses a bicycle fork leg assembly having a fork crown which includes a first end and a second end. A steerer tube extends from the fork crown between the first end and the second end. A first fork leg is secured to the first end of the fork crown and a second fork leg is secured to the second end of the fork crown. A first dropout is secured to an end of the first fork leg and a second dropout is secured to an end of the second fork leg. Each of the first fork leg and the second fork leg have a forward deflected shape relative to interaction of the respective fork leg with the fork crown such that each of the first dropout and the second dropout is located forward of a plane that includes a longitudinal axis of the steerer tube and an axis that extends between the first end and the second end of the fork crown. A first dampener is engaged with the first dropout and is isolated from the first fork leg by the first dropout. A second dampener that is a mirror image of the first dampener is engaged with the second dropout and is isolated from the second fork leg by the second dropout. Each of the first dampener and the second dampener are formed of a non-rigid material and extend about at least more than half of an external cross-sectional circumference of the respective first and second dropout.

Another aspect of the invention that is useable and/or combinable with one or more of the aspects disclosed above discloses a method of dampening vibration of a fork leg of a bicycle fork assembly. A dropout is secured to a fork leg that extends in a non-linear path from a fork crown. A slot is formed in the dropout for cooperating with a wheel axle such that the slot is positioned rearward of a terminal end of fork leg positioned within the dropout. A dampener is provided that wraps about an external surface of the dropout and is isolated from the fork leg by the dropout such that the damper extends continuously about a portion of a lateral left, a rear, and a portion of a lateral right external surface of the dropout.

These and various other aspects and advantages of the present invention will be made apparent from the following detailed description and the drawings.

BRIEF DESCRIPTION OF THE DRAWINGS

The drawings illustrate one preferred embodiment presently contemplated for carrying out the invention.

FIG. 6 is a perspective view of the dampener associated with the right hand fork leg shown in FIG. 5 removed from the fork assembly and with a counterweight removed therefrom;

FIG. 7 is a perspective view of the right hand fork tip portion of the fork assembly shown in FIG. 4;

FIG. 8 is a cross-sectional view of the fork tip assembly shown in FIG. 7 and taken along line 8-8 shown in FIG. 7;

Figure 1:
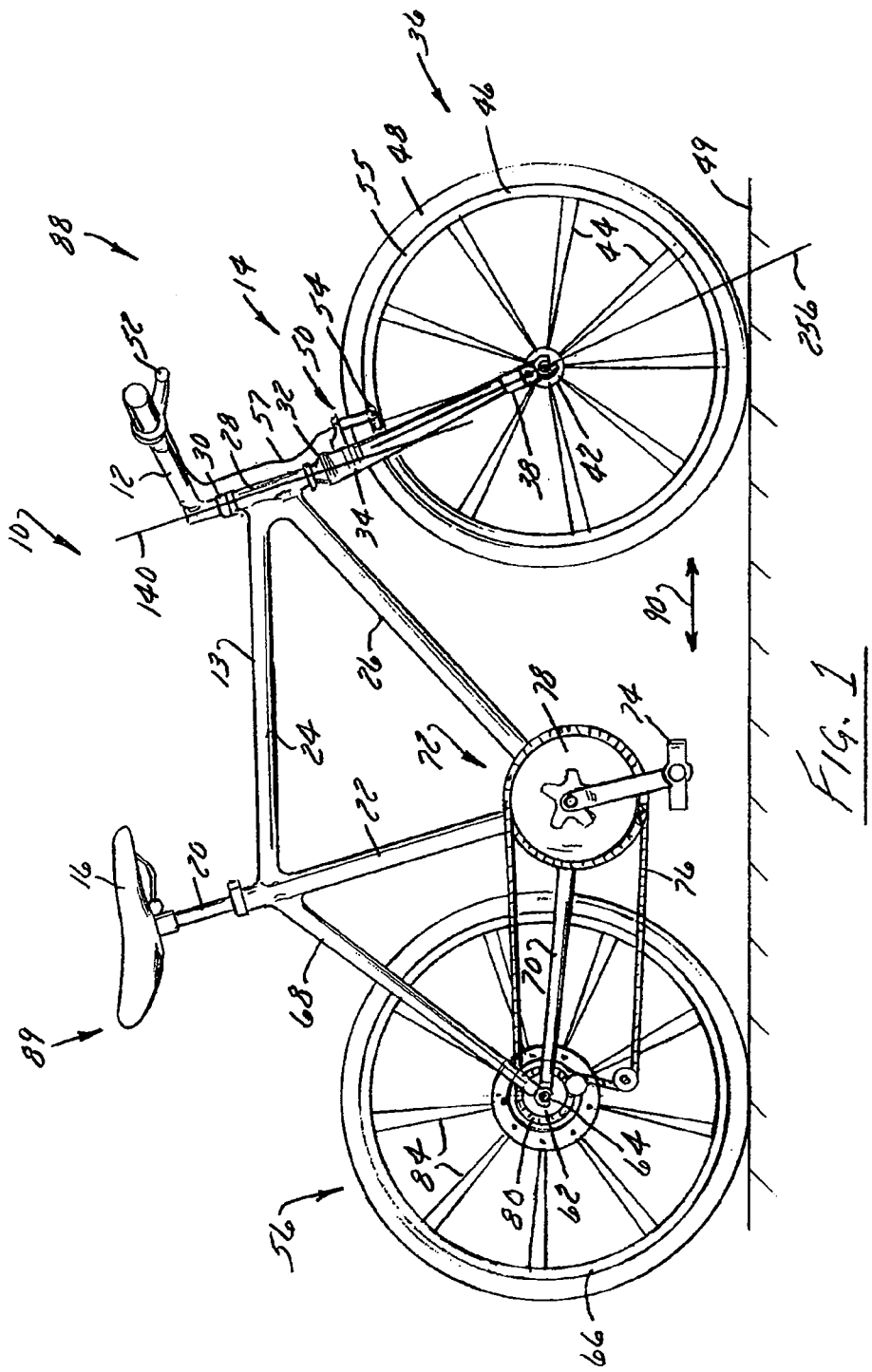
FIG. 1 is a side elevation view of a bicycle equipped with a bicycle fork assembly according to one embodiment of the present invention.

In describing the preferred embodiments of the invention which are illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. Such terms are not limited to direct connection but include connection through other elements where such connection is recognized as being equivalent by those skilled in the art.

Detailed Description of The Preferred Embodiment

FIG. 1 shows an exemplary bicycle 10 equipped with a combined fork leg and steerer assembly 14 according to one embodiment of the present invention. A handlebar assembly 12 is connected to a fork or steerer assembly 14 of bicycle 10 and is rotatable relative to bicycle 10 to effectuate steering of the bicycle. Handlebar assembly 12 and a seat 16 are attached to a frame 13 of bicycle 10. A seat post 20 is connected to seat 16 and slidably engages a seat tube 22 of frame 13. A top tube 24 and a down tube 26 extend in a forward direction from seat tube 22 to a head tube 28 of frame 13. Handlebar assembly 12 is rigidly connected to a stem or steerer tube 30 that passes through head tube 28 of frame 13 and is secured or otherwise attached to a fork crown 32 of fork and steerer assembly 14. Handlebar assembly 12 is rotatably attached to bicycle 10 such that handlebar assembly 12 and fork crown 32 rotate about a longitudinal axis of steerer tube 30.

Although handlebar assembly 12 is shown as what is commonly understood as a "straight," "BMX," or "flat" bar configuration, those skilled in art will readily appreciate that, even through such handlebars are commonly not linear, such handlebars typically include a single grip site that is located at the opposite ends of the handlebar with the steerer tube secured to the handlebar therebetween. It is appreciated that the present invention is applicable to other handlebar shapes such as, for example, "drop," "ergo," "anatomic," "bull-horn," and/or "moustache" handlebar shapes which are commonly defined by generally more curvilinear shapes and frequently include one or more grip sites that are provided at elevations that allow a rider to attain a "tucked" orientation relative to the bicycle. It is appreciated that the present invention is usable with bicycles configured for road and off-road use and for use with handlebars having virtually any shape.

Figure 9:
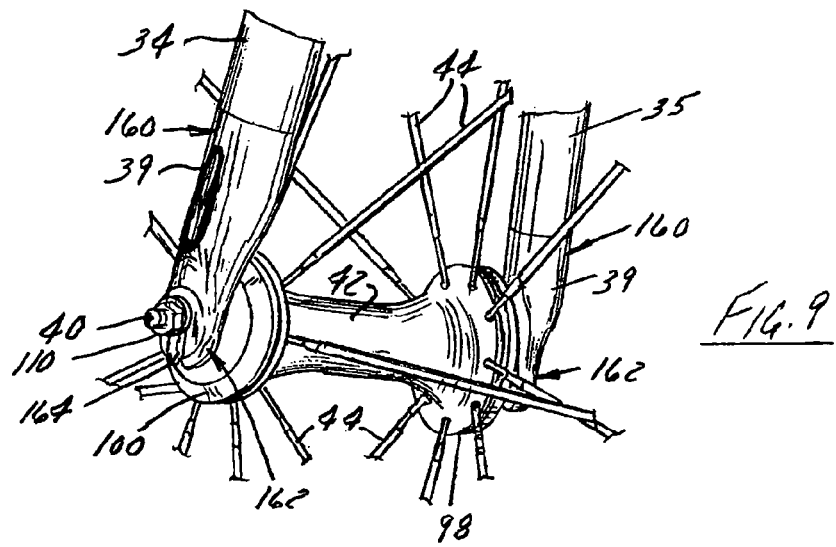
FIG. 9 is a view similar to FIG. 2 of another embodiment of a fork assembly having a pair of fork legs and a fork tip or dropout assembly according to another embodiment of the invention.
Figure 10:
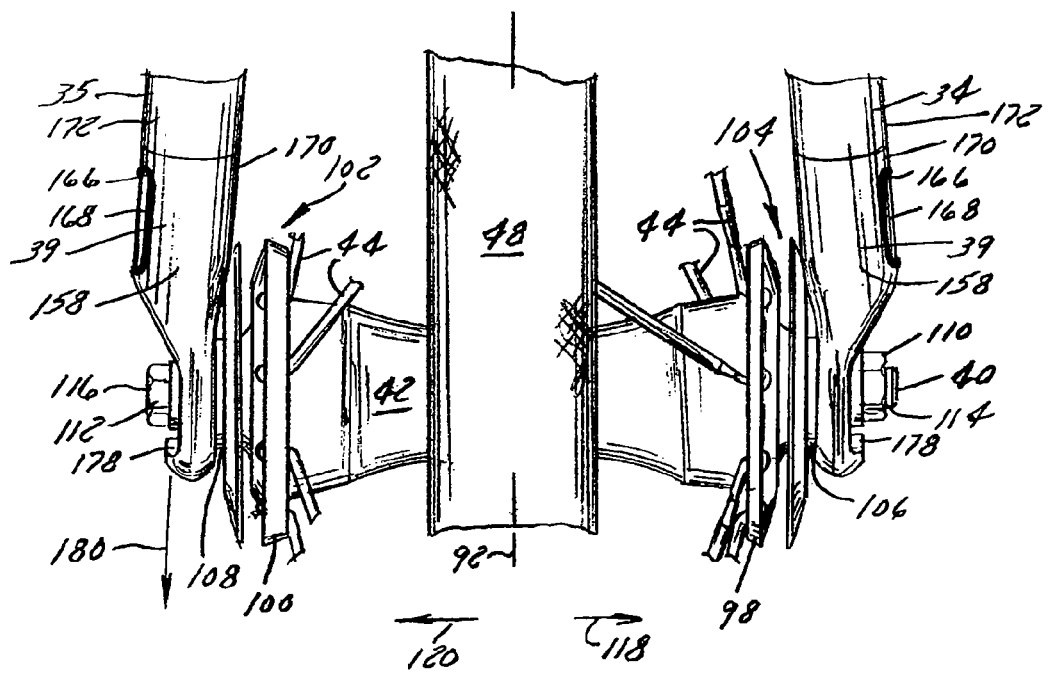
FIG. 10 is a view similar to FIG. 3 of the fork tip portion of the fork assembly shown in FIG. 9.

Referring to FIGS. 1-4, steerer assembly 14 includes a pair of forks, fork blades or fork legs 34, 35 that extend from generally opposite lateral sides or ends 31, 33 (FIG. 4) of fork crown 32. Fork legs 34, 35 support a front wheel assembly 36 at an end thereof via a fork tip, a dropout assembly, or simply a dropout 38 constructed according to one embodiment of the invention. As explained further below, FIGS. 9 and 10 show a steerer assembly 14 equipped with a pair of dropouts 39 according to a second embodiment of the invention. As is commonly understood, right and left hand dropouts 38, 39 are provided as mirror images of one another with respect to the longitudinal plane of bicycle 10.

Referring to FIGS. 1-4, right and left hand dropouts 38 cooperate with generally opposite sides of an axle 40 that is engaged with a hub 42 of front wheel assembly 36. A number of spokes 44 extend from hub 42 to a rim 46 (FIG. 1) of front wheel assembly 36. A tire 48 is engaged with rim 46 such that rotation of hub 42 and rim 46, relative to fork legs 34, 35, rotates tire 48 relative to a ground surface 49 (FIG. 1). As is commonly understood, side to side rotation of handlebar assembly 12 turns front wheel assembly 36 in a lateral direction to facilitate steering of bicycle 10.

Bicycle 10 includes a front brake assembly 50 that is operationally connected to an actuator(s) 52 attached to handlebar assembly 12 at one or more locations proximate interaction of the rider's hands with handlebar assembly 12. The brake assembly includes a pair of brake pads 54 that are positioned on generally opposite lateral sides of front wheel assembly 36. The brake pads selectively engage a brake wall 55 of rim 46 and thereby provide a stopping or slowing force to front wheel assembly 36. The brake pads are attached to a caliper assembly that is operationally connected to the handlebar supported actuator by a brake cable 57 or other flexible driving member, such as a fluid connection member. It is further appreciated that although brake assembly 50 is shown as what is commonly understood as a rim brake, brake assembly 50 could alternatively be configured as a disk brake system wherein the brake assembly is positioned nearer the hub of the wheel assembly and interacts with a disk secured thereat. Examples of both such systems are fairly common in the art.

Referring to FIG. 1, bicycle 10 includes a rear wheel assembly 56 that can also be equipped with a rim or disc brake assembly which is not shown for clarity. Rear wheel assembly 56 includes a rear wheel hub 62 that is supported by a rear axle 64. The rear wheel brake assembly can be configured to interact with a rim 66 of rear wheel assembly 56 in a manner similar to the association of the front brake assembly 50 and front wheel assembly 36 or configured to include a brake disk secured proximate hub 62 and operable via another actuator secured to handlebar assembly 12. It is appreciated that either or both of the front and rear wheel brake assemblies can be provided with either a rim or a disk brake assembly.

Still referring to FIG. 1, axle 64 of rear wheel assembly 56 is offset from a crankset 72 by one or more seat stays 68 and chain stays 70. Crankset 72 includes a set of pedals 74 that is operationally connected to a flexible drive member such as a chain 76 via a gear set, chain ring, or sprocket 78. Rotation of chain 76 communicates a drive force to a gear cluster 80 positioned proximate rear axle 64 and selectively operably connected to hub 62 of rear wheel assembly 56. Gear cluster 80 is generally concentrically orientated with respect to rear axle 64 and, like crankset 72, can include a number of variable diameter gears to alter the power conversion associated with the drive train of bicycle 10.

Gear cluster 80 is operationally connected to hub 62 of rear wheel assembly 56. A number of spokes 84 extend radially between hub 62 and rim 66 of rear wheel assembly 56. As is commonly understood, rider operation of pedals 74 drives chain 76 thereby driving rear wheel assembly 56 which in turn propels bicycle 10 along ground surface 49. Steerer assembly 14 and front wheel assembly 36 supports a forward end 88 and rear wheel assembly 56 supports a rearward end 89 of bicycle 10 relative to ground surface 49. Handlebar assembly 12 is connected to frame 13 and steerer assembly 14 such that rider manipulation of handlebar assembly 12 is communicated to steerer assembly 14 to facilitate turning of front wheel assembly 36 relative to frame 13 with respect to a longitudinal axis, indicated by line 90, of bicycle 10. As is commonly understood, such manipulation of handlebar assembly 12 steers bicycle 10 via rotation of front wheel assembly 36 out of the plane associated with longitudinal axis 90 of bicycle 10.

Understandably, the construction of bicycle 10 shown in FIG. 1 is merely exemplary of a number of bicycle configurations. That is, whereas bicycle 10 is shown as what is commonly understood as road, cross-over or multi-purpose bicycle, it is appreciated that steerer assembly 14 as described further below is useable with other bicycle configurations such as bicycles intended to be ridden on only paved surfaces, commonly referred to a street or a road bike, as well as off-road, hybrid, mountain, and/or dirt bikes, commonly configured to be primarily ridden on unpaved surfaces, as well as cross-over bicycle configurations that are configured to be ridden on both paved and generally smooth but unpaved surfaces. Regardless of the configuration of bicycle with respect to the intended riding surface, vibrations associated with bicycle operation can be communicated to the rider via the rider interaction with the handlebar assembly which is secured to steerer assembly 14. Steerer assembly 14 is constructed to mitigate, limit, or reduce the vibrations of the steerer assembly 14 that can be communicated to handlebar assembly 12 and therefrom to frame 13 of bicycle 10 and to the hands of the rider via handlebar assembly 12.

Figure 2:
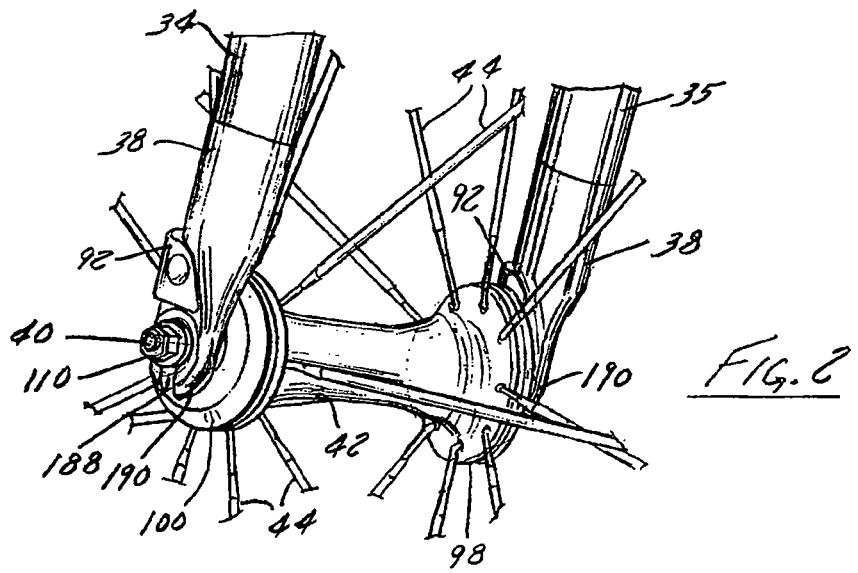
FIG. 2 is a perspective view of the fork tip portion of the fork assembly shown in FIG. 1 with a wheel engaged therewith.
Figure 3:
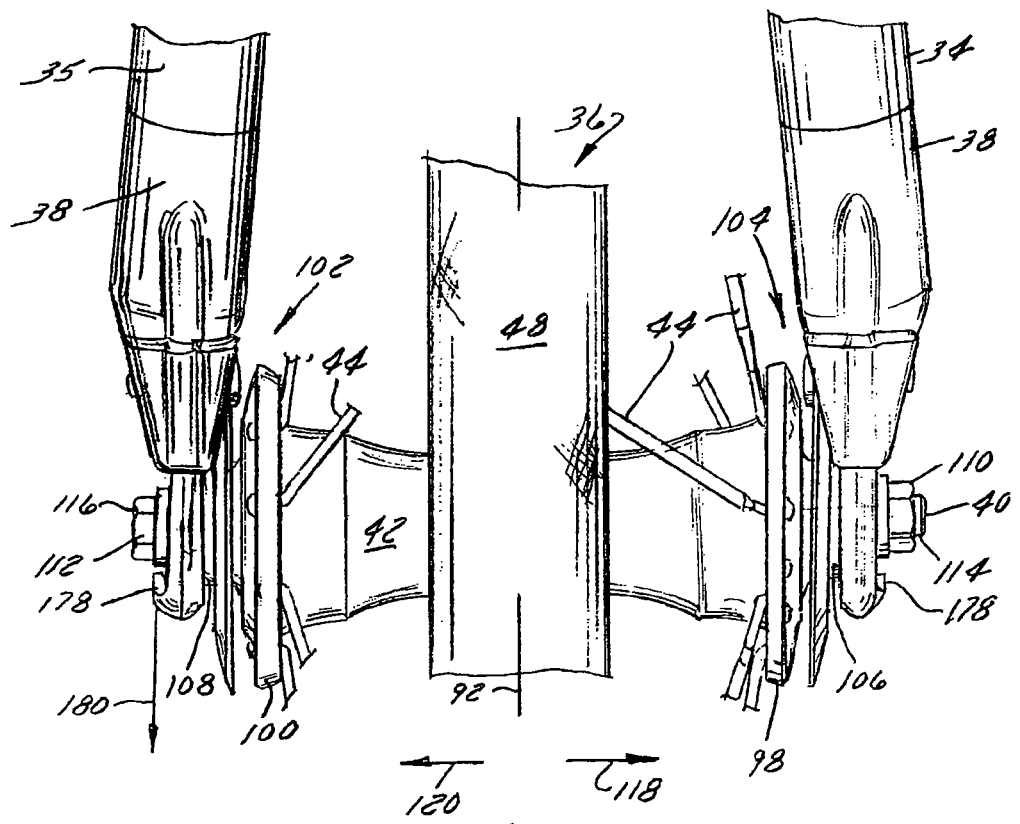
FIG. 3 is an elevation view of the fork tip portion of the fork assembly as shown in FIG. 2.

FIGS. 2-3 show front wheel assembly 36 engaged with the right and left hand dropouts 38 of steerer assembly 14. It is appreciated that steerer assembly 14 could be provided with two dropouts having the construction of dropout 38, two dropouts having the construction of dropout 39 (FIGS. 9-11), or non-similarly constructed dropouts 38, 39. It is further appreciated that those embodiments of steerer assembly 14 wherein alternate right hand and left hand dropouts have similar constructions, the respective dropouts would preferably be provided as mirror images of one another relative to a plane associated with the longitudinal axis 90 of bicycle 10.

As used herein, the alternate right hand and left hand directions refer to the orientation of the respective fork leg assembly relative to a rider seated upon bicycle 10. As also used herein below, lateral inboard and lateral outboard directions refer to directions that are oriented in crossing directions relative to a longitudinal plane 92 (FIG. 3) of bicycle 10 and face in the respective opposite direction relative to the recited structure and/or the longitudinal axis 90 or longitudinal plane 92 of bicycle 10. A forward facing or simply forward direction refers to the generally forward travel direction of bicycle 10 wherein rearward directions refer to the direction generally opposite the forward travel direction. Regardless of the construction of the respective dropout 38, 39, tire 48 is positioned laterally inboard of both dropouts 38 and/or 39 and the corresponding fork legs.

Referring to FIGS. 2 and 3 and 9 and 10, hub 42 includes a first spoke flange 98 and the second spoke flange 100 that are positioned at generally opposite ends 102, 104 of hub 42. A first bearing 106 is disposed between hub 42 and right hand dropout 38 and a second bearing 108 is disposed between hub 42 and left hand dropout 38. Spokes 44 extend in an outward radial direction from spoke flanges 98, 100 to the rim positioned behind tire 48. Axle 40 extends beyond dropouts 38 and/or 39 and rotationally secures front wheel assembly 36 relative to fork legs 34, 35 and the respective right and left hand dropouts 38 and/or 39. A securing device 110, 112 is engaged with opposite ends 114, 116 of axle 40 at locations laterally outboard, indicated by lines 118, 120 (FIG. 3) of respective right and left hand dropouts 38 and/or 39. Although shown generally as nuts, it is appreciated that securing devices 110, 112 could be provided in any number of configurations such as axle head portions and/or one or more bicycle wheel quick release assemblies that cooperate with axle 40 to effectuate expedient removal of wheel assembly 36 from the alternate dropouts 38 and/or 39 when desired.

Figure 4:
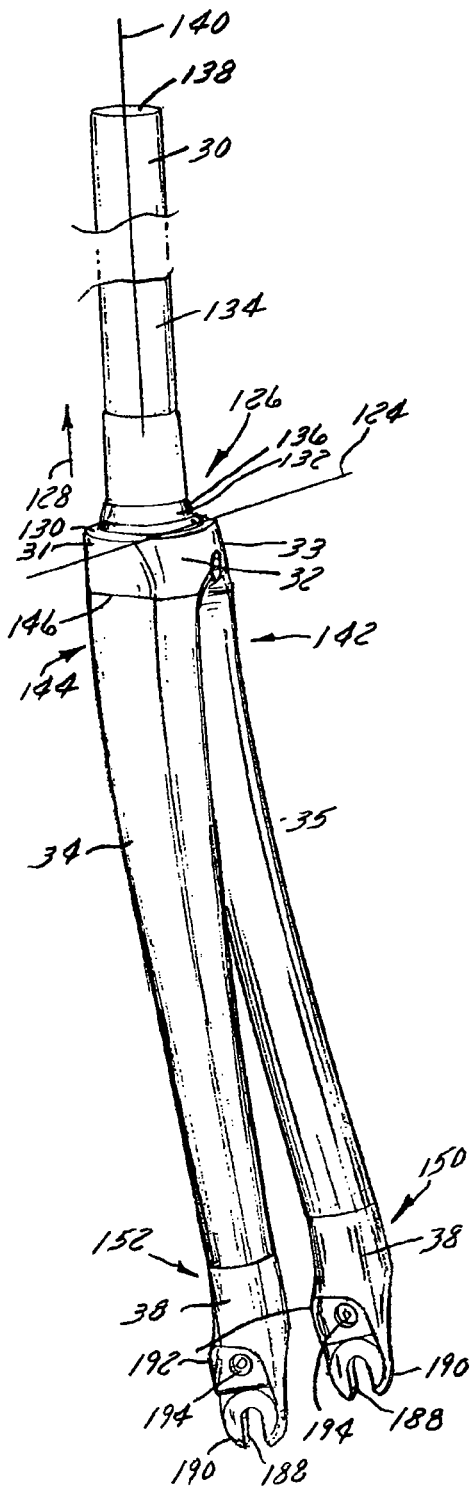
FIG. 4 is perspective view of the fork assembly shown in FIG. 1 removed from the bicycle and with the wheel removed therefrom.
Figure 5:
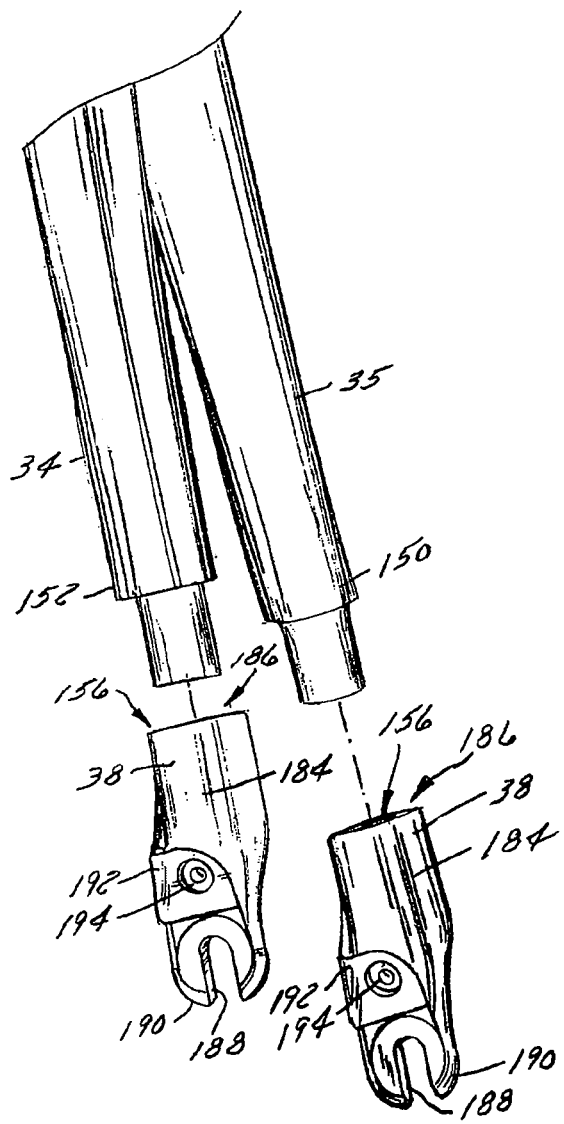
FIG. 5 is a partial exploded view of the fork tip portion of the fork assembly shown in FIG. 4.

Referring to FIGS. 4 and 5, first end 31 and second end 33 a fork crown 32 are oriented to extend along a lateral axis, indicated by line 124, of steerer assembly 14. First end 31 and second end 33 are generally associated with the widest portion of fork crown 32. Steerer tube 30 extends in a first or upward direction, indicated by arrow 128, relative to a top surface 130 of fork crown 32. One or more bearing races or seats 132 are formed proximate the interface of steerer tube 30 and fork crown 32. Steerer tube 30 is generally defined by an elongate body 134 that extends from a first end 136 that is secured to fork crown 32 and a second end 138 that is constructed to be secured to handlebar assembly 12 (FIG. 1). Body 134 of steerer tube 30 extends along a longitudinal axis, indicated by line 140, and has a length sufficient to extend beyond head tube 28 of bicycle frame 13 (FIG. 1).

Each fork leg 34, 35 includes a first end 142, 144 that is secured or otherwise connected to a downward facing side 146 of fork crown 32. It is appreciated that one or more of steerer tube 30, fork crown 32, and fork legs 34, 35 may be formed of similar or dissimilar materials, such as metal based materials such as aluminum, fiber based materials such as carbon fiber materials, and/or combinations thereof. It is further appreciated that one or more of steerer tube 30 and fork crown 32, fork crown 32 and fork legs 34, 35, and each of steerer tube 30, fork crown 32, and fork legs 34, 35 can be formed as a single body having a unitary, continuous, or inseparable construction.

Each fork leg 34, 35 includes a second end 150, 152 that is secured to a respective right and left hand corresponding dropout 38 and/or 39. It is further appreciated that either of dropouts 38, 39 can be integrally formed with a respective fork leg 34, 35. Preferably, each dropout 38, 39 is formed as a separate component that is formed of a dissimilar material of the respective fork leg and is secured thereto. It is further appreciated that each of the respective right and left dropouts 38 and/or 39 can be formed of the same, a similar, or a different material than the respective fork leg 34, 35. When provided as a separate component as shown, each of the right and left hand dropouts 38 and/or 39 includes a corresponding cavity 154, 156 that is shaped to slidably receive an end 150, 152 of the respective fork legs 34, 35. Preferably, right and left hand dropouts 38 and/or 39 are permanently bonded or otherwise permanently adhered to the respective fork leg 34, 35. Each cavity 154, 156 is preferably shaped to generally mimic the shape of the corresponding end 150, 152 of the respective fork leg 34, 35.

Figure 11:
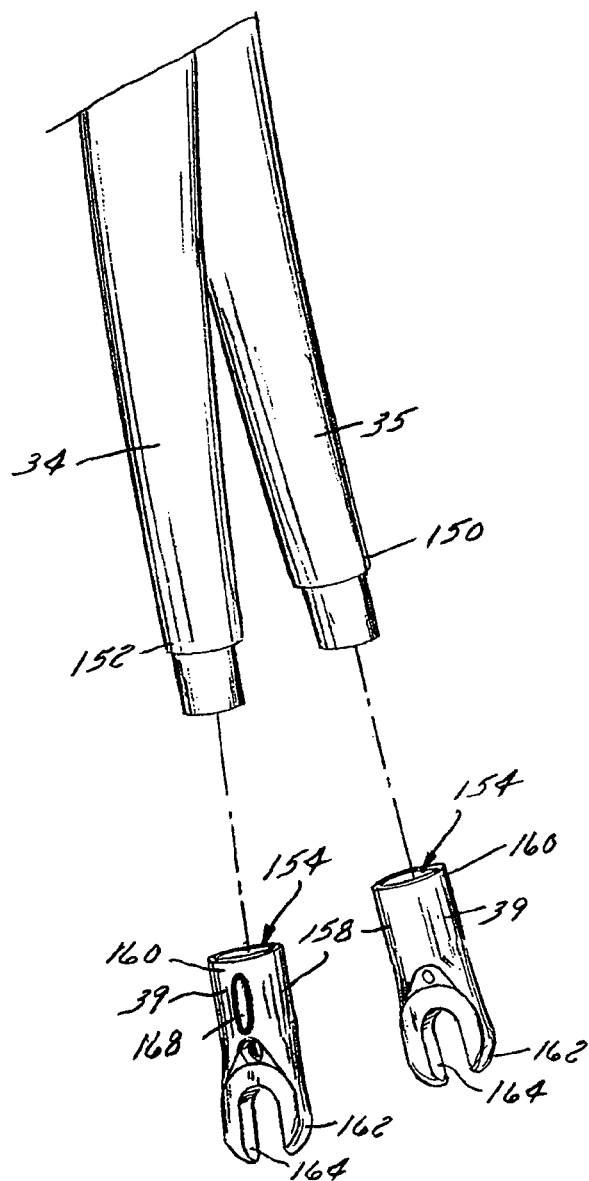
FIG. 11 is a view similar to FIG. 5 of the fork assembly shown in FIG. 9.

As shown in FIGS. 9-11, right and left hand dropouts 39 each include a body 158 that defines cavity 154 at a first end 160 thereof. A second end 162 of each dropout 39 includes a passage or a slot 164 that is shaped to slidably cooperate with a respective alternate end of axle 40 of wheel assembly 36. Body 158 of dropout 39 includes another cavity or opening 166 that is shaped to receive a dampener 168. Preferably, dampener 168 is formed of an elastomeric material or a material that is more elastic than the material from which body 158 of dropout 39 is formed. The material of dampener 168 is selected such that dampener 168 dampens, absorbs, dissipates, or otherwise mitigates vibration of dropout 39 and/or fork leg 35.

As also shown in FIGS. 9-11, an exterior surface 170 of each dropout 39 is generally contoured to match an exterior surface 172 of a corresponding fork leg 34, 35 thereby providing a fairly continuous contour associated with the exterior surface interface between of dropouts 39 and fork legs 34, 35. Referring to FIGS. 9 and 10, a projection 178 extends from body 158 proximate slot 164 so as to prevent the undesired translation of axle 40 and/or securing device 112 in a downward lateral direction, indicated by arrow 180, relative to the respective dropout 38, 39 even if securing device 112 is not in a fully closed or secured orientation. Referring back to FIGS. 2 and 3, each right and left hand dropout 38 includes a similar projection or tab 182 that also provides a redundant retention configuration associated with the cooperation of the respective ends of axle 40 and securing device 110 relative to the corresponding dropout 38. Said in another way, each of the left and right hand dropouts 38, 39 are constructed to provide a redundant securing of wheel assembly 36 to overcome improper operation of securing devices 110, 112.

Referring to FIGS. 3 and 5, the shape and contour of each of the right and left hand dropouts 38 and corresponding cavity 156 is also defined by a respective body 184 of the respective dropout 38. Cavity 156 is formed in a first end 186 of each body 184 and a channel or slot 188 is formed in a second end 190 thereof. A dampener 192 is secured to each dropout 38 and extends about more than half of the circumference of the body 184 of each respective dropout 38 as compared to a lateral cross-section associated with the location of dampener 192 along the longitudinal axis of the right and left hand dropouts 39 as shown in FIGS. 9-11. As explained further below with respect to FIGS. 6-8, an optional weight 194 passes through dampener 192 and is constructed to removably cooperate with dampener 192 associated with dropout 38. It is further appreciated that the right and left hand dropouts 39 as shown in FIGS. 9-11 could also include a fastener or weight that is cooperates with the dampener, is isolated from the structure of the corresponding fork leg, and wherein the weight and/or fastener compresses or biases the respective dampener into engagement with the body of the respective dropout. It is further appreciated that the mass of the respective weight and/or fastener can be selected to further improve the vibration dampening performance of the corresponding respective leg of the underlying fork assembly.

As shown in FIG. 6, like dampener 168, dampener 192 is defined by a body 198 that is preferably formed of an elastomeric material. Body 198 includes a first end 200 and the second end 202 such that body 198 has a generally elongated, albeit curved shape wherein a first portion 204 of body 198 overlaps another portion 206 of elongate body 198. Body 198 includes third or intermediary portion 208 that extends in a crossing direction relative to first portion 204 and second portion 206. First portion 204, second portion 206, and intermediary portion 208 can be oriented to define a gap 210 bounded by a laterally inboard facing surface or side 212 of body 198. It is appreciated that when not engaged with dropout 38, depending on the elasticity and physical memory of body 198, body 198 may deflect from the shape shown in FIG. 6 so as to have a generally linear shape until positioned about dropout 38. It is further appreciated that body 198 could be constructed as a continuous loop configured to circumscribe or entirely surround the body of the respective dropout without otherwise engaging the structure of the respective fork leg.

Still referring to FIG. 6, body 198 of dampener 192 includes a first hole or opening 214 and a second hole or opening 216 that are oriented in first portion 204 and second portion 206 of body 198, respectively. Openings 214, 216 are positioned in body 198 so as to generally align and/or overlap one another when body 198 is formed in a shape that mimics the shape of dropout 38. Weight 194 cooperates with openings 214, 216 and traverses gap 210 defined by body 198 of dampener 192. As explained further below, when weight 194 is secured to dampener 192 and dropout 38, dampener 192 isolates weight 194 from direct contacting engagement with dropout 38 and direct engagement with the respective fork leg.

As shown in FIGS. 7-8, dampener 192 extends about a portion, indicated by line 220, of a laterally outboard facing side 222, a rearward facing side 224, and a portion similar to portion 220, of a laterally inboard facing side 226 of dropout 38. Said in another way, dampener 192 does not extend fully circumferentially about dropout 38 but extends about at least more than half of the circumference of dropout 38 with respect to a horizontal cross-section associated with the interaction of the dampener with the dropout. Alternatively, it is appreciated that dampener 192 could be shaped to extend entirely about the respective dropout 38.

As shown in FIG. 8, weight 194 includes a first portion 230 and a second portion 232 that operatively engage one another via a threaded interface 234 formed between the first portion 230 and the second portion 232. Inboard facing side 212 of dampener 192 includes a first lip 236 and a second lip 238 that extend in a laterally inboard direction from body 198 and cooperate with a hole or opening 240 formed in dropout 38. Opening 240 formed in dropout 38 offset in a longitudinal direction of fork leg 34 and dropout 38, indicated by arrow 242, from slot 188 formed in dropout 38. Lips 236, 238 have an outer radial diameter, indicated by arrow 246, that is generally the same as the radial diameter of opening 240, and an inner radial diameter, indicated by arrow 248, that is generally the same as the radial diameter of the shaft portion 250 of weight 194.

Engagement of weight 194 with dampener 192 secures dampener 192 relative to dropout 38 in a manner wherein weight 194 is offset or isolated from direct engagement with dropout 38. Weight 194 is constructed to bias dampener 192 into snug engagement with the body of the respective right and left hand dampener 192 to improve the vibration dampening performance of dampener 192 when engaged with the respective right and left hand dropout 38. It is further appreciated that each dampener 192 and corresponding weight 194 could be constructed to allow weight 194 to move or otherwise oscillate relative to dropout 38 via the elastic performance of dampener 192 during operation of bicycle 10. Such a construction allows dampener 192 and weight 194 to each contribute to vibration dampening isolation and mitigation associated with the vibration of dropout 38 and fork legs 34 caused by the interaction of wheel assembly 36 with surface 49 (FIG. 1) and with slot 188 of dropout 38. It is appreciated that weight 194 can be selected to have a mass, and dampener 192 can be selected to have an elastic performance that allows weight 194 and dampener 192 to each contribute to quelling vibrational oscillation of fork leg 34 and dropout 38 associated with operation of bicycle 10.

It is further appreciated that each of right and left hand dropouts 39 as shown in FIGS. 9-11 could also be provided with a weight or fastener assembly wherein the fastener biases dampener 168 into snug engagement with body 158 of dropout 39 and the dampener 168 maintains positional isolation of the fastener from direct contact with body 158 of dropout 39 and that dampener 168 and dropout 39 maintain a spaced relationship of the fastener from the respective fork leg.

Referring to FIGS. 1, 4, and 7, fork leg and steerer assembly 14 further improves the vibration dampening performance associated with use of steerer assembly 14 due to the geometric orientation of steerer tube 30 relative to the alternate right and left hand dropouts 38 and/or 39 associated with fork legs 34, 35 regardless of the dampening performance associated the use of a pair of respective dropouts 38, 39 and/or with dampener 168, 192 and/or weight 194. That is to say, the forthcoming description is equally applicable to the construction and operation of the fork assembly shown in FIGS. 2 and 3 as well as the fork assembly shown in FIGS. 9 and 10.

Referring to FIGS. 1 and 4, longitudinal axis 140 of steerer tube 30 is generally defined as being contained in a common plane with the lateral axis 124 of fork crown 32. As shown in FIG. 1, right and left hand fork legs 34 (fork legs 35 shown in FIGS. 9 and 10) are oriented in a forward swept, non-linear orientation relative to axis 140 (and the plane associated with axis 124) and relative to the longitudinal axis 90 of bicycle 10. Although represented by line 256 in FIG. 1, it should be appreciated that the longitudinal length of fork legs 34, 35 have a somewhat curvilinear shape such that dropouts 38, 39 are maintained at a forward positioned location relative to the longitudinal axis 140 of steerer tube 30. Referring to FIG. 7, the longitudinal axis, indicated by line 258, of slot 188 is positioned rearward of a forward most facing edge 260 of fork legs 34, 35 whereas dampener 168 (FIG. 9), and at least a substantial portion if not all of dampener 192, are oriented rearward of forward edge 260 of the respective fork leg 34, 35 and in proximity to the longitudinal alignment with axis 258 of slot 188. Such a construction allows fork legs 34, 35 to provide greater vertical compliance, or the vertical vector component associated with translation of dropout 38, 39 relative to head tube 28 via deflection of fork legs 34, 35, than fork leg and steerer assemblies having a more generally linearly oriented steerer tube and fork leg longitudinal axis. Such a configuration allows fork legs 34, 35, regardless of the construction or use of respective dropouts 38, 39, to deflect in the fore and aft directions with greater vertical deflection so as to mitigate vibration and/or jarring impacts communicated though fork legs 34, 35 and fork crown 32 to steerer tube 30 and head tube 28 of bicycle frame 13. Whereas dampener's 168, 192 and weight 194 dissipate, mitigate, or absorb vibrations already imparted to fork legs 34, 35, the forward swept orientation of fork legs 34, 35 relative to the longitudinal axis of steerer tube 30 limits the communication of road vibrations the fork legs 34, 35 via dropouts 38, 39. Accordingly, both the forward swept configuration of fork legs 34, 35 relative steerer tube 30 and the interaction of dampeners 168, 192, and weight 194 contribute to the efficient elimination of vibrations and/or repetitive movements that detract from rider comfort. Accordingly, bicycle 10 provides a bicycle that can be ridden for extended durations while mitigating the detrimental effects on rider fatigue attributable to fork leg and steerer assembly vibration.

Therefore, a vibration dampening bicycle fork assembly according to one embodiment of the invention includes a pair of fork legs that sweep in a forward direction relative to a longitudinal axis of a steerer tube that extends in an opposite direction from a fork crown. A dropout is secured to a distal end of each fork leg and a dampener that is preferably formed of an elastomeric material wraps about at least a portion of each dropout. Preferably, a passage extends through the dropout and is aligned with a pair of openings formed in opposite lateral sides of the dampener. An optional fastener or weight cooperates with the passage formed in the fork leg and the pair of openings formed in the opposite lateral sides of the dampener and biases the dampener into snug engagement with the respective dropout. Preferably each fastener has a mass that is selected to also counteract vibration of the respective fork leg.

Another embodiment of the invention that includes one or more aspects that can be combined with one or more aspects of the above embodiment includes a bicycle fork leg assembly having a steerer tube with a longitudinal axis and which extends from a first side of fork crown in a first direction. The fork leg assembly includes a first fork leg and a second fork leg. Each fork leg has a respective longitudinal axis and extends from opposite lateral ends of the fork crown in a second direction that is generally opposite the first direction and such that the longitudinal axis of each fork leg extends in a more forward direction than the longitudinal axis of the steerer tube when secured to a bicycle. A dropout is secured to a distal end that is opposite the fork crown of each of the first fork leg and the second fork leg. Each dropout has an axle opening that cooperates with an axle associated with a wheel. A dampener that is formed of a resilient material is engaged with each dropout. Each dampener is defined by a body having a length that is sufficient to allow the dampener to wrap about an exposed surface of the corresponding dropout.

Another embodiment of the invention that is usable or combinable with one or more of the aspects of the above embodiments includes a bicycle fork leg assembly having a fork crown which has a first end and a second end. A steerer tube extends from the fork crown between the first end and the second end. A first fork leg is secured to the first end of the fork crown and a second fork leg secured to the second end of the fork crown. A first dropout is secured to an end of the first fork leg and a second dropout is secured to an end of the second fork leg. Each of the first fork leg and the second fork leg have a forward deflected shape relative to interaction of the respective fork leg with the fork crown such that each of the first dropout and the second dropout is located forward of a plane that includes a longitudinal axis of the steerer tube and an axis that extends between the first end and the second end of the fork crown. The fork leg assembly includes a first dampener that is engaged with the first dropout and isolated from the first fork leg by the first dropout and a second dampener that is a mirror image of the first dampener and engaged with the second dropout. The second dampener is isolated from the second fork leg by the second dropout. Each of the first dampener and the second dampener are formed of a non-rigid material and extend about at least more than half of an external cross-sectional circumference of the respective first and second dropout.

Another embodiment of the invention that includes or is combinable with one or more of the aspects of one or more of the above embodiments includes a method of dampening vibration of a fork leg of a bicycle fork assembly. The method includes securing a dropout to a fork leg that extends in a non-linear path from a fork crown. A slot is formed in the dropout for cooperating with a wheel axle such that the slot is positioned rearward of a terminal end of fork leg positioned within the dropout. A dampener is provided that wraps about an external surface of the dropout and is isolated from direct contact with the fork leg by the dropout such that the damper extends continuously about a portion of a lateral left, a rear, and a portion of a lateral right external surface of the dropout.

The present invention has been described in terms of the preferred embodiment, and it is recognized that equivalents, alternatives, and modifications, aside from those expressly stated, are possible and within the scope of the appending claims.

What is claimed is:

1. A bicycle fork leg assembly, comprising:
    a fork crown;
    a steerer tube having a longitudinal axis and extending from a first side of the fork crown in a first direction;
    a first fork leg and a second fork leg, each fork leg having a respective longitudinal axis and extending from opposite lateral ends of the fork crown in a second direction that is generally opposite the first direction and such that the longitudinal axis of each fork leg extends in a more forward direction than the longitudinal axis of the steerer tube when secured to a bicycle;
    a dropout directly secured to a distal end of each of the first fork leg and the second fork leg wherein the distal end is opposite the fork crown, each dropout having an axle opening that cooperates with an axle associated with a wheel of the bicycle; and
    a dampener formed of a resilient material engaged with each dropout, each dampener defined by a body having a length which wraps about an exposed generally vertical outer surface of the respective dropout, wherein the dampener is in contact with no more than three sides of the exposed generally vertical outer surface of each corresponding dropout.

2. The fork leg assembly of claim 1, further comprising a passage formed in each dropout and wherein the passage is positioned to be overlapped by alternate ends of the respective dampener, and wherein the dampener does not separate the dropout and the respective fork leg.

3. The fork leg assembly of claim 2, further comprising a first hole and a second hole formed in the dampener and positioned to overlap the passage formed in the respective dropout.

4. The fork leg assembly of claim 3, further comprising a removable fastener that cooperates with the respective passage, first hole, and second hole such that the fastener is positionally isolated from contact with the dropout by the corresponding dampener and compresses the dampener against the dropout.

5. The fork leg assembly of claim 4, wherein the fastener further comprises a first portion and a second portion that are selectively engageable with one another and has a mass that is selected to dampen vibration of the respective fork leg.

6. The fork leg assembly of claim 5, wherein each of the first portion and the second portion of the fastener include a head portion that is incapable of passing through an adjacent one of the first hole and the second hole of the dampener.

7. The fork leg assembly of claim 3, wherein a longitudinal center axis of the passage formed in each dropout is above and rearward of a longitudinal centerline axis of the axle opening and the dampener extends about opposite left and right lateral sides and a rear facing side of the dropout.

8. A bicycle fork leg assembly, comprising:
    a fork crown having a first end and a second end;
    a steerer tube that extends from the fork crown between the first end and the second end;
    a first fork leg secured to the first end of the fork crown;
    a second fork leg secured to the second end of the fork crown;
    a first dropout directly secured to an end of the first fork leg and a second dropout directly secured to an end of the second fork leg, each of the first fork leg and the second fork leg having a forward deflected shape relative to interaction of the respective fork leg with the fork crown such that each of the first dropout and the second dropout are located forward of a plane that includes a longitudinal axis of the steerer tube and an axis that extends between the first end and the second end of the fork crown;
    a first dampener engaged with the first dropout, the first dampener being isolated from the first fork leg by the first dropout;
    a second dampener engaged with the second dropout, the second dampener being isolated from the second fork leg by the second dropout; and
    each of the first dampener and the second dampener being formed of a non-rigid material and wrapping about at least more than half of an external cross-sectional circumference of the respective first dropout and second dropout.

9. The fork leg assembly of claim 8, further comprising a slot formed in each of the first and second dropouts and shaped to slidably cooperate with an axle associated with a bicycle wheel.

10. The fork leg assembly of claim 9, further comprising a hole formed in each of the first and second dropouts such that a circumference of each hole is entirely bounded by a body of the dropout and the hole is offset from the slot.

11. The fork leg assembly of claim 10, wherein each of the first dampener and the second dampener includes a first hole and a second hole that align with the hole formed in the respective first and second dropouts.

12. The fork leg assembly of claim 11, wherein each of the first dampener and the second dampener includes a first lip and a second lip that each extend in a laterally inboard direction about a respective one of the first hole and the second hole formed in each dampener, each lip being defined by a radially inner diameter that corresponds to a diameter of the one of the respective first hole and second hole formed in the respective one of the first dampener and the second dampener and a radially outer diameter that is the same as a diameter of the hole formed in the respective one of the first dropout and the second dropout.

13. The fork leg assembly of claim 12, further comprising a first weight that cooperates with the first dampener and a second weight that cooperates with the second dampener, each weight having a stem portion that passes through both of the first hole and the second hole of the respective one of the first dampener and the second dampener and a first head portion positioned laterally outboard of one of the first hole and the second hole of the respective one of the first and the second dampener and a second head portion positioned laterally outboard of the other of the first hole and the second hole of the respective one of the first and the second dampener relative to a longitudinal centerline of the dropout.

14. The fork leg assembly of claim 13, wherein each of the first dampener and the second damper include a portion that extends laterally outboard beyond an end face of the first head portion and the second head portion of the respective one of the first weight and the second weight.

15. The fork leg assembly of claim 13, wherein the first dampener isolates the first weight from direct contact with the first dropout and the second dampener isolates the second weight from direct contact with the second dropout.

16. The fork leg assembly of claim 12, further comprising a gap between the first lip and the second lip.

17. A method of dampening vibration of a fork leg of a bicycle fork assembly, comprising:
rigidly securing a dropout directly to a fork leg that extends in a non-linear path from a fork crown;
forming a slot in the dropout for cooperating with a wheel axle of a bicycle wheel; and
providing a dampener formed of a resilient material that wraps about an external surface of the dropout and is isolated from direct contact with the fork leg by the dropout such that the damper extends continuously about a portion of a lateral left side, a rear facing side, and a portion of a lateral right side of the external surface of the dropout.

18. The method of claim 17, wherein the dampener is formed of an elastomeric material.

19. The method of claim 18, further comprising providing a fastener secured to the dropout and isolated from direct contact with the dropout by the dampener and constructed such that tightening of the fastener biases the dampener into engagement with the dropout.

20. The method of claim 19, further comprising providing the fastener as a two-part assembly wherein the fastener passes through the dampener at two different locations thereof and passes through the dropout at one location thereof.

21. The method of claim 20, further comprising selecting a mass of the fastener such that the mass dampens vibration performance of the respective fork leg.

22. The method of claim 20, further comprising providing a right fork leg assembly and a left fork leg assembly that are mirror images of one another.

\* \* \* \* \*